United States Patent
Lajus et al.

(10) Patent No.: US 9,255,162 B2
(45) Date of Patent: Feb. 9, 2016

(54) POLYMERISATION PROCESS

(71) Applicant: INEOS EUROPE AG, Rolle (CH)

(72) Inventors: Guillaume Lajus, Martigues (FR); Rupert Parkinson, Stirlingshire (GB); Leslie William Bolton, Fleet Hampshire (GB)

(73) Assignee: INEOS EUROPE AG, Rolle (CH)

( * ) Notice: Subject to any disclaimer, the term of this patent is extended or adjusted under 35 U.S.C. 154(b) by 0 days.

(21) Appl. No.: 14/419,552

(22) PCT Filed: Aug. 1, 2013

(86) PCT No.: PCT/EP2013/066156
§ 371 (c)(1),
(2) Date: Feb. 4, 2015

(87) PCT Pub. No.: WO2014/023637
PCT Pub. Date: Feb. 13, 2014

(65) Prior Publication Data
US 2015/0191557 A1    Jul. 9, 2015

(30) Foreign Application Priority Data

Aug. 6, 2012    (EP) .................................... 12179365

(51) Int. Cl.
*C08F 2/00* (2006.01)
*C08F 110/06* (2006.01)
(Continued)

(52) U.S. Cl.
CPC ................. *C08F 10/06* (2013.01); *C08F 10/00* (2013.01); *C08F 10/02* (2013.01)

(58) Field of Classification Search
CPC .......... C08F 10/00; C08F 10/06; C08F 10/02; C08F 2/34; C08F 210/16; C08F 210/08
USPC ............................................ 526/68, 351, 352
See application file for complete search history.

(56) References Cited

U.S. PATENT DOCUMENTS 5,541,270 A    7/1996  Chinh et al.
6,001,938 A * 12/1999  Chinh .................... B01J 8/1809
                                                          526/160

(Continued)

FOREIGN PATENT DOCUMENTS

EP    0 824 117 A1    2/1998
WO    WO 97/25355 A1  7/1997

(Continued)

OTHER PUBLICATIONS

Harriott, Peter, Associate Professor of Chemical Engineering, Cornell University, "Process Control", *McGraw-Hill Book Company* (5 pgs.) Published 1964.

(Continued)

*Primary Examiner* — William Cheung
(74) *Attorney, Agent, or Firm* — Nixon & Vanderhye P.C.

(57) ABSTRACT

Process for the polymerization of olefins in a gas phase fluidized bed reactor, by i) passing a fluidizing gas to the reactor to fluidize a bed of polymer particles therein, ii) withdrawing the fluidizing gas from the reactor, iii) cooling all or a portion of the fluidizing gas withdrawn from the reactor to a temperature at which a portion of the components of the fluidizing gas condense to form condensed liquid, and iv) passing condensed liquid and non-condensed components of the fluidizing gas back to the reactor. A reservoir of condensed liquid downstream of the cooling step is provided, and variations in the inventory of the condensed liquid are made in order to control the temperature in the reactor.

24 Claims, 2 Drawing Sheets

(51) Int. Cl.
*C08F 110/02* (2006.01)
*C08F 10/06* (2006.01)
*C08F 10/00* (2006.01)
*C08F 10/02* (2006.01)

(56) References Cited

U.S. PATENT DOCUMENTS 6,384,157 B1 5/2002 Cai et al.
2005/0091021 A1 4/2005 Gupta et al.

FOREIGN PATENT DOCUMENTS

WO    WO 99/00430 A1    1/1999
WO    WO 02/062857 A1    8/2002

OTHER PUBLICATIONS

Shinskey, F.G.; Process Control Systems, Third Edition, Application, Design, and Tuning (6 pgs.) Published 1988.

* cited by examiner

POLYMERISATION PROCESS

This application is the U.S. national phase of International Application No. PCT/EP2013/066156 filed Aug. 1, 2013 which designated the U.S. and claims priority to European Patent Application No. 12179365.7 filed Aug. 6, 2012, the entire contents of each of which are hereby incorporated by reference.

The present invention relates to a process for the polymerisation of olefins in a gas phase fluidised bed reactor, and in particular to the temperature control of such a reactor.

BACKGROUND OF THE INVENTION

The production of polymer particles, such as polyethylene and polypropylene, by polymerising the respective monomer, and optionally a comonomer, in the gas phase is well known. In a fluidised bed polymerisation process, monomer and catalyst are passed into a reaction zone wherein they react to form polymer particles which are maintained in a fluidised state by continuously passing through the bed of polymer a gas, known as a fluidising gas. The fluidising gas usually comprises the monomer to be reacted, and optionally comonomers, as well as a number of other components well known to the person skilled in the art. Reactants and catalyst are introduced into the reaction zone to replace those that have reacted and produced polymer is withdrawn.

Fluidising gas which has passed through the bed of polymer particles is withdrawn from the reaction zone and recycled via an external conduit for re-use. The recycle gas comprises unreacted monomers and usually fresh monomer is added to this stream prior to the reaction zone to replace that which has reacted.

The polymerisation reaction itself is highly exothermic. In order to control the temperature of the reaction zone it is known to cool the recycling fluidising gas. It is also known to cool the recycling fluidising gas so that a portion of it condenses and forms a liquid, which can also be recycled to the reaction zone. Vaporisation of this liquid occurs providing significant cooling to the reaction zone.

Examples of such processes can be found in EP 824117, WO 97/25355 and WO 99/00430, each of which describe a polymerisation process where the recycling fluidising gas is cooled so that a portion of it condenses and forms a liquid, which liquid is then recycled to the reaction zone.

In a "balanced" reaction the rate of heat generation is balanced by cooling to maintain a constant temperature in the reaction zone. In practise, it is necessary to monitor the temperature of the reaction zone and have a system to compensate if the temperature starts to vary from that desired.

In particular, reaction rate increases can lead to an increase in the temperature of the reaction zone. The temperature increase can itself lead to a further increase in reaction rate, which due to the reaction exotherm can cause yet a further increase in temperature. The increase in temperature can result in production of off-specification material and large increases in temperature and reaction rate can lead to reaction well outside of the desired operating range, which can lead to fouling of the reactor and necessitate shut-down.

Any control system should allow the process to react to temperature changes quickly enough to keep the reaction temperature within well-defined limits (for a particular product). Thus, in a conventional system an increase in the temperature in the reactor above a desired temperature is compensated for by increasing the cooling applied to the recycle stream. In a system with condensation of a portion of the recycle stream this results in an increased amount of condensed liquid formed, which is then passed to the reactor where it effects additional cooling and cools the reactor again. Obviously the reverse applies if a decrease in the temperature in the reactor below a desired temperature is observed.

The time which the system takes to respond to the temperature increase or decrease may be referred to as the "deadtime" of the control scheme.

To date such control has been relatively straightforward because the time over which changes in temperature might appear and take effect has been relatively long compared to deadtime of typical control schemes.

DESCRIPTION OF THE INVENTION

However, it has now been found that as the production rate of polymerisation processes increases it becomes necessary to design the control for the cooling systems to act more rapidly.

Thus, in a first aspect the present invention provides a process for the polymerisation of olefins in a gas phase fluidised bed reactor, the polymerisation process comprising
  i) passing a fluidising gas to the reactor to fluidise a bed of polymer particles therein,
  ii) withdrawing the fluidising gas from the reactor,
  iii) cooling all or a portion of the fluidising gas withdrawn from the reactor to a temperature at which a portion of the components of the fluidising gas condense to form condensed liquid, and
  iv) passing condensed liquid and non-condensed components of the fluidising gas back to the reactor,
wherein there is provided a reservoir of condensed liquid downstream of the cooling step, and variations in the inventory of the condensed liquid are made in order to control the temperature in the reactor.

Taking the example of an increase in temperature in the reactor, resulting in a requirement for additional cooling of the reactor, in the conventional process an increase in flow of condensed liquid to the reactor only occurs subsequent to the provision of additional cooling i.e. additional cooling is provided to the recycle gas, causing additional condensation. This results in an increase in formation of condensed liquid, which then flows to the reactor. The deadtime of such a system depends on a number of factors including the time taken for the provision of additional cooling, usually involving a change in the flow of cooling medium to the cooling step, and the transport time of the additional condensed liquid to the reactor.

In some processes the condensed liquid may be separated from the non-condensed components in the cooled recycle gas in a gas-liquid separator in which liquid is collected in the base and then passed to the reactor. Control of liquid flow according to the conventional system can then be based on maintaining a constant liquid level in the collector by level control. An example of such a process can be found in EP 824117. Thus, the transport time for the additional condensed liquid to the reactor includes the transport time from the cooling step to the separator, the response time of the level control in the separator, and the transport time from the separator to the reactor.

Generally the biggest contribution to the deadtime however arises in the cooling step. Cooling preferably takes place in a heat exchanger by contact of the fluidising gas withdrawn from the reactor with a cooling medium, usually water. To obtain an increase in cooling usually the flow of the cooling medium to the heat exchanger is increased by opening a flow control valve. The delays in the cooling arise from the transport time of the cooling medium from the flow control valve to the heat exchanger and the thermal inertia of the heat exchanger, the latter especially being potentially quite difficult to reduce significantly.

The present invention avoids this delay by maintaining a reservoir of condensed liquid downstream of the heat exchanger, and allowing the inventory of the liquid to vary.

Thus, taking again the Example where an increase in reactor cooling is required, the control system takes two steps. One is the "conventional" step of increasing the cooling applied to the fluidising gas stream withdrawn from the reactor. The other is to reduce the inventory in the reservoir and increase the liquid flow to the reactor. Put another way, the control system does not wait until the effect of the increased cooling on the fluidising gas is observed as an increase in the amount of condensed liquid before the cooling to the reactor is increased, and thereby avoids all of the deadtime due to the cooling step.

By "inventory of the liquid" as used herein is meant the amount of liquid present in the reservoir. The actual inventory may be considered in any suitable terms, such as an absolute volume or mass of liquid. However, in terms of the process of the present invention the variations in the inventory are most easily measured by measuring liquid level, an increased liquid level representing an increased inventory and vice versa. It can be noted that small oscillations in liquid level (and hence inventory) can be obtained when trying to maintain "constant" liquid level as in the "conventional" control system. These oscillations are not made in order to control the temperature in the reactor, but arise simply from the feedback nature of liquid level control around a defined level set point. (In fact, as should be clear from the explanation above the object of the liquid level control is to maintain a constant level and thereby prevent variations in the inventory, and by this means to control the flow of liquid to the reactor and the temperature therein.)

Oscillations during liquid level control are generally insufficient to cause a noticeable oscillation in the temperature in the reactor. In contrast, the variations in the liquid inventory according to the present invention result in a measurable change in reactor temperature due to the variations, by which is meant a change in the temperature of at least 0.1° C., for example, at least 0.2° C.

Generally, the inventory variation according to the present invention is such that $\Delta TNR$ is greater than 0.1° C., $\Delta TNR$ being defined as follows:

$$\Delta TNR = R^*(\Delta m/\text{mass\_bed})$$

Where:
$\Delta m$ = change in mass of liquid in the reservoir [kg]
mass_bed = mass of polymer in the fluidised bed reactor [kg]
R = 137 [and has units of ° C.]

For oscillation during liquid level control $\Delta m$ corresponds to the difference between the mass of liquid at the maximum level reached by the oscillation and the mass of liquid at the minimum level reached by the oscillation in the reservoir (in kg), and is relatively small, such that $\Delta TNR$ is less than 0.1° C.

The parameter mass_bed in the above equation should be calculated from the fluidised bed density and the volume of the fluidised bed of polymer.

In particular, the fluidised bed density can be calculated by measuring differential pressure ($\Delta P$) using two pressure taps located at different heights in the reactor fluidized bed as known in the art, and using the equation:

$$FBD = \Delta P/(g \times \Delta h)$$

Where:
$\Delta P$ = the differential pressure [Pa]
g = 9.81 m/s² is the standard gravity
$\Delta h$ = the height difference between the 2 pressure taps [m]

Bed height, and hence the volume of the bed, can also be determined from differential pressure tap measurements, but as used herein and where reaction takes place in a cylindrical reaction zone, the bed volume can be assumed to correspond to the volume of the cylindrical part of the reactor. Thus:

$$\text{mass\_bed} = 3.14 \times (\text{reactor\_diam})^2 \times \text{bed\_height} \times FBD/4$$

Where:
reactor_diam = internal diameter of the cylindrical part of the reactor [m]
bed_height = the height between the top of the cylindrical part of the reactor and the reactor grid [m]
FBD = the polymer fluidized bulk density [kg/m³].

Oscillations during liquid level control are also generally small compared to the liquid level/inventory itself, usually resulting in changes of less than 2-3% relative to the total inventory. In contrast, the variations in the liquid inventory according to the present invention result from allowing variations in the inventory away from an initial inventory set point in the reservoir, preferably from an initial liquid level set point.

Such variations are also generally of significantly greater magnitude than the oscillations noted above, for example generally being of at least 5% compared to the initial inventory and often of at least 10% compared to the initial inventory. Where determined as variations of the liquid level the variations are generally of at least 5% compared to the initial liquid level and often of at least 10% compared to the initial liquid level. (The percentage variations in inventory and liquid level will generally be similar but not correlate exactly.)

The process of the present invention generally comprises a temperature control system for the reactor, which temperature control system acts as follows in the event that a variation in the cooling in the reactor is required:
a) the control system acts to vary the inventory of liquid in the reservoir, and
b) the control system acts to adjust the amount of cooling applied to the gas withdrawn from the reactor, usually in a heat exchanger.

The variation in cooling for the process overall arises from the change in step (b), as in the conventional temperature control system. Usually this involves an adjustment to the flow of cooling medium to a heat exchanger to thereby increase or decrease the amount of cooling as required. However, the variation of inventory of liquid in step (a) does not wait for the variation in cooling due to step (b) to take effect.

In a first embodiment the control system in step (a) may act directly on the flow of liquid from the reservoir to the reactor. For example, in relation to a requirement for increased cooling the control system directly increases the flow of liquid to the reactor, for example by opening a valve or other flow control means. This reduces the inventory as more liquid exits the reservoir.

In this embodiment there may be no direct control on the inventory in the reservoir. Nevertheless, inventory control, for example liquid level control, is preferably used to ensure that at least a minimum inventory is maintained in the reservoir. As an example, the control system may alter the flow of cooling medium in step (b) not just based on the required cooling in the reactor but also based on a measurement representative of the inventory in the reservoir, for example, based on the liquid level in the reservoir. Preferably, the control system acts to maintain the inventory within a range defined by minimum and maximum values. This may be achieved based on minimum and maximum "absolute" values of the inventory, such as a total volume of liquid, or based on values representative of the inventory, such as liquid level values.

The minimum inventory ensures that an amount of liquid is maintained in the reservoir sufficient to enable an increase in liquid flow if additional cooling is required to the reactor. The maximum inventory ensures that the reservoir can cope with any further reductions in liquid flow.

In this first embodiment, the control system may act to stabilise the liquid in the reservoir at a new inventory. Taking again the example where more cooling is required in the reactor, the increased flow rate of liquid starts to lower the inventory in the reservoir, but as the increased cooling in step (b) takes effect the rate of condensation should match the adjusted withdrawal rate. This will then stabilise the liquid at a new, but lower, inventory. This should generally be above any minimum inventory which may have been set.

Alternatively, the control system may act to return the liquid reservoir to a predefined inventory, or to an inventory within a defined range. In such a circumstance any defined range should be narrow range compared to any minimum and maximums which may have been set for the inventory more generally. Thus, in the example above rather than simply reaching a position where the adjusted rate of condensation matches the adjusted withdrawal rate of liquid to the reactor, the control system provides additional cooling to condense further liquid and return the liquid to a predefined inventory.

In a second embodiment, the control system in step (a) acts by changing the inventory set point in the reservoir. This may preferably be achieved by changing the liquid level set point in the reservoir. For example, in relation to a requirement for increased cooling the control system lowers the inventory/liquid level set-point. The inventory controller, in order to reduce the inventory to the new set point then directs an increased flow of liquid from the reservoir.

In this embodiment the inventory set point is preferably adjusted based on a reactor temperature. This may be based directly on a reactor temperature or may be based on the differential between a reactor temperature and a reactor temperature set point. The reactor temperature may be an individual measurement or may be an averaged measurement over several measurements in the reactor.

Taking the example where the liquid level set point is adjusted based directly on a reactor temperature, an increase in temperature results directly in a decrease in the liquid level set point in the reservoir, the new liquid level set-point being dependent on the temperature measurement.

Taking the example where the liquid level set point is adjusted based directly on differential between a reactor temperature and a reactor temperature set point, an increase in temperature differential results directly in a decrease in the liquid level set point in the reservoir, the new liquid level set-point being dependent on the temperature differential.

In the above examples, when the reactor temperature returns to its original set point (or the temperature differential returns to zero), the inventory set point also returns to its original level. This second embodiment simplifies the overall control of the inventory.

The second embodiment is also advantageous because it can be more easily retrofitted to systems which already have liquid level control in the reservoir.

The invention removes the deadtime of the temperature control associated with the heat exchanger cooling.

The altering of the inventory of liquid in the reservoir in step (a) and the altering of the cooling in step (b) are performed in parallel. Generally both are altered as quickly as possible once a temperature change is required, but in terms of minimising the response time of the system to a reactor temperature variation step (a) is the most important. Step (b) principally controls the amount of cooling required overall, although the response of step (b) can influence the inventory of liquid required in the reservoir i.e. if step (b) is relatively slow to respond then a bigger liquid inventory is required in the first embodiment described above to allow for the potential change in liquid inventory in the time until the changes of step (b) take effect in the reservoir.

The present invention enables a reduction in the "deadtime" of the temperature control system.

As used herein, "deadtime" is the time between the temperature control system taking an action to alter reactor temperature, and the time when the change in temperature is measurable in the reactor.

In the "conventional" control system noted above, where the control system compensates for a temperature change by increasing or decreasing the cooling applied to the recycle stream and waits for the effect of this, the deadtime is the time from when the control system requests a change in the applied cooling to when the temperature change due to this increase or decrease in cooling is observed in the reactor. In the "conventional" control system this includes the time for the cooling medium flow control valve to respond, the transport time of the cooling medium from the flow control valve to the heat exchanger (or other cooling means), the thermal inertia of the heat exchanger, the residence time of the condensed liquid in the heat exchanger, the liquid transport time to the reactor, this latter including the time in any separation steps and for any liquid level control that may be present, and any delays in the reactor (e.g. transport time in the reactor to the temperature measurement point and any delay due to the measurement itself.)

In contrast, in the process according to the present invention the deadtime is the time from when the control system requests a change in the liquid inventory in the reservoir (either a liquid level change or flow change or other change) to when the temperature change due to this change is observed in the reactor. This can include the time for the condensed liquid flow control to respond or the inventory set point control system to respond, and the transport time for the condensed liquid to the reactor from the reservoir, and any delays in the reactor, but excludes any delays in the flow of cooling medium/cooling step.

The various delays can generally depend on a number of factors. Transport times, for example, depend on flow velocities and pipe lengths, whereas the delays in the reactor can depend on the measurement location and the circulation velocity.

The exact deadtime can also depend on the deconvolution of the temperature increase from background noise in temperature measurements.

However, in general, the process according to the present invention has a deadtime at least 50% lower than the deadtime as would be determined for the same system under the same process conditions but based on the deadtime measured from when the control system requests a change in the applied cooling to the recycle stream if the variation in liquid inventory according to the present invention is not performed (hereinafter referred to as a "comparative deadtime"). Preferably, the process according to the present invention has a deadtime at least 60% lower than the comparative deadtime, preferably at least 70% lower.

As noted above the exact deadtime can depend on a number of variables. By comparing the relative deadtime of the process of the present invention to a comparative deadtime based on an equivalent process in the manner noted above the effect of the process variables are negated.

However, although in absolute terms the exact deadtime can depend on a number of variables, the process according to the present invention generally provides a control system with a deadtime of 120 seconds or less, more preferably 90 seconds or less, and most preferably 60 seconds or less.

The above figures are particularly applicable to a commercial scale fluidised bed process, as determined by directing a temperature change in such a commercial scale fluidised bed reactor under the following defined conditions:

A seed bed of polymer should be fluidised in the reaction zone by a fluidising gas at a superficial fluidisation velocity in the reaction zone of 0.65 m/s. The temperature in the reaction zone is measured on a thermocouple 5 meters above the fluidisation grid and should initially be set to 85° C., with no polymerisation occurring i.e. no active catalyst is present. The temperature set point of the reaction zone should be reduced to 80° C. in the control system. The controller signal which initiated the change in inventory (e.g. which signals the change in liquid level set point) is used as the time zero, and the temperature in the reaction zone is monitored. The deadtime is the time until the temperature change resulting from the control signal is observed in the temperature measurement. In order to remove any noise in the temperature measurement, the temperature should be measured past the deadtime time, and the temperature curve obtained extrapolated back to obtain the deadtime value using a curve-fitting package.

Although the above provides a specific method for determining a specific value of the dead-time, it will be appreciated that the dead-time may also be approximated under a number of different conditions, and that in general the fluidisation velocity, the location of the thermocouple, the temperature set point/change, and the determination of when the temperature change is observed have a relatively minor influence on the deadtime of a process. Thus, measurements under other conditions can still give a good approximation of the deadtime that would be obtained under the defined conditions above.

For example, whilst the above uses a specific fluidisation velocity and thermocouple height in the reaction zone for a fluidised bed reaction, the deadtime is not strongly dependent on these values and can be reasonable accurately determined using a different fluidisation velocity or thermocouple height.

Similarly, whilst the above use specific temperature reductions under non-reactive conditions, a good approximation of the deadtime may also be obtained by determining the time for a temperature change to be measured following a change in set point under reactive conditions i.e. during normal operation.

Similarly, the use of a different extrapolation method will only make relatively minor differences in the value of deadtime obtained.

By "commercial scale fluidised bed reactor" as used above is meant a reactor designed to enable operation at a production rate of at least 25 tonnes/hr.

More generally, and in a second aspect, the present invention provides a process for the polymerisation of olefins in a gas phase fluidised bed reactor, the polymerisation process comprising i) passing a fluidising gas to the reactor to fluidise a bed of polymer particles therein, ii) withdrawing the fluidising gas from the reactor, iii) cooling all or a portion of the fluidising gas withdrawn from the reactor to a temperature at which a portion of the components of the fluidising gas condense to form condensed liquid, and iv) passing condensed liquid and non-condensed components of the fluidising gas back to the reactor, wherein the process has a temperature control system for the reactor which has a deadtime of 120 seconds or less.

The deadtime in this second aspect is generally as defined (and can be determined as defined) in the first aspect of the present invention. Preferably the deadtime is 90 seconds or less, and most preferably 60 seconds or less.

Making variations in the inventory of the condensed liquid in order to control the temperature in the reactor reduces the deadtime as already described. Reductions in the deadtime can also be achieved by careful design and control of the general factors which can contribute to deadtime. As already noted this can include factors such as transport times, and valve and flow controller response times.

Downstream of a condensed liquid reservoir the factors are:

1. The liquid transport delay from the reservoir to the reactor.
2. The control valves on the condensed liquid flow/injection.
3. The transport delay within the reactor from the liquid injection point to where the temperature is measured.
4. The temperature measurement thermowell.
5. Any filters on the temperature measurement.

The liquid transport delay can be minimised by reducing the pipe length between the reservoir and the reactor. Reducing pipe diameter also increases velocity (for a fixed volumetric flow rate).

Flow control delays can be reduced by implementing control using an instantaneous valve characteristic inversion control, rather than PID control. This is a method of flow control that can be used where the pressure drop across a control valve is repeatable. In this case the valve is "characterised" by testing to measure the flow at various valve positions. Then in order to obtain a particular flow the valve can be set at the position known to achieve that flow. This removes the need to measure and feedback the flow during normal operation removing measurement and controller lags.

The transport delay within the reactor depends on the measurement location and the fluidising gas velocities and can reduced by the careful selection of the location of the temperature measurement.

A lag in the temperature measurement in a thermowell caused by heat transfer rate through the wall of the reactor can be minimised by minimising wall thickness, and minimising, preferably avoiding entirely, filters on the data measurement. Preferably, temperature measurement is made using a probe located inside the reactor to avoid lag cause by heat transfer rate through the wall to a thermowell.

Whilst not directly relevant to the deadtime of the temperature control system in the process of the present invention, similar steps may also be taken upstream of the liquid reservoir. Such steps will increase the response of the upstream cooling, enabling the compensation for the variation in liquid inventory in the reservoir to occur more quickly.

Factors which can contribute to the response time upstream include:
1. The liquid transport time in the cooling medium circuit.
2. The cooling medium temperature controller.
3. The cooling medium make-up flow controller.
4. The cooling medium make-up valve.

5. The thermal capacity of heat exchangers or other cooling means.

The cooling medium supply system usually comprises a cooling medium circuit by which cooling medium is passed through one or more heat exchangers, wherein the cooling medium cools the recycling fluidising gas, and a cycling pump for circulating the cooling medium within the circuit. There is also provided a line for introduction of fresh (cold) cooling medium to the circuit which enables temperature control of the cooling medium.

The "liquid transport time" is the time taken from when fresh cooling medium enters the cooling circuit to when it enters the heat exchanger. This can be minimised by locating the cooling medium entry point close to the heat exchanger and by reducing the pipe diameters in between these two points.

The cooling medium temperature controller determines the amount of fresh cooling medium required to obtain a particular cooling medium temperature. In order to minimise overall deadtime this preferably uses an instantaneous heat balance calculation rather than a proportional-integral derivative (PID) controller.

In particular, a heat balance calculation may be used to determine the temperature of water at a mixing point between a warm and cold stream. PID control would operate by measuring the stream temperature after mixing and adjusting the mix of cool and warm water flows appropriately. This introduces time lags resulting from the lag of the temperature measurement and further lags due to the action of the PID controller.

In an instantaneous heat balance calculation the mix of cool and warm water flow necessary to give the required circulating water temperature is directly calculated from the circulating water flow and the temperatures of the warm and cold streams prior to mixing. Using this method a change in temperature of the mixed stream can be obtained without incurring addition measurement and control related delays. (Note that there is no feedback in such a system so there can be an off-set between the set-point of the water temperature and actual water temperature. However, in the present invention the actual circulating water temperature is not of interest—only its impact on the reactor temperature and so the offset can be ignored.)

The cooling medium make-up flow control is preferably implemented with an instantaneous valve characteristic inversion control, rather than PID control in a similar manner to the control valves on the condensed liquid flow.

The cooling medium make-up valve can also be designed to reduce its contribution to the overall deadtime due to the cooling medium circuit. The valve should be fast-acting with a valve positioner. As used herein, the term "fast acting valve" means a valve designed to operate faster than 1.5 s, preferably less than 1 s. In contrast, a "typical" valve may operate in approximately 2.5 s or more. The design of fast-acting valves is in itself known, and the "fast-action" may be achieved by use of a large actuator and ensuring a robust and large air supply. A fast acting valve also allows the associated controllers to be timed more tightly giving a more rapid control response.

The process for the production of polymer in either of the first or second aspects of the present invention may be any suitable polymerisation process, but preferably is a process for the production of polyethylene or polypropylene by polymerisation of ethylene or propylene respectively. Typical comonomers are a-olefins other than the ethylene or propylene. (For avoidance of doubt ethylene can be a comonomer for propylene polymerisation and vice versa.)

In general the acceptable deadtime for a polymerisation process has been found to reduce as the production rate increases. In particular, and without wishing to be bound by theory, it is believed that at higher production rates the reactor operates closer to unstable operating windows, and small changes can have a larger effect more quickly.

It has also been found that the desired maximum deadtime for a particular production rate can depend on the polymer being produced. In particular, the enthalpy of ethylene polymerisation per unit mass is greater than that of higher olefins such as 1-hexene and 1-butene per unit mass. Thus, production of polyethylene by homopolymerisation of ethylene produces a higher amount of heat per unit mass than production of polyethylene by co-polymerisation of ethylene and a comonomer such as 1-butene or 1-hexene (the enthalpy also decreasing with increased degree of comonomer incorporation in the product).

For a particular production rate, homopolymerisation of ethylene would therefore have a stronger requirement for a low deadtime than co-polymerisation because of the higher heat generation.

However, in practical terms, most of the major contributions to deadtime (e.g. cooling medium system generally, and valves and pipework elsewhere) are independent of the polymer being formed and the cooling medium system and process will need to be designed to be able to produce a deadtime less than the "worst-case" scenario. Put another way, for a particular cooling system/apparatus it may be that there is limited ability to change the deadtime, but production rate can be increased for production of polymers with lower enthalpy of formation.

The production rate is preferably at least 40 tonnes/hour. As used herein, "production rate" means the rate at which polymer is removed from the reactor, measured as weight of solids per hour. The weight should be measured after degassing and drying to remove gaseous and other hydrocarbons which may be associated with the polymer as it leaves the reactor.

Preferably the production rate is at least 50 tonnes/hour, such as 55 tonnes/hour.

As well as the production rate, the absolute reaction temperature can have an effect on the acceptable deadtime. In particular, at higher reaction temperatures it has been generally found that the change in activity with temperature change is reduced compared to at lower temperatures.

For example at temperatures within the reaction zone in the range from 75° C. to 95° C. and a deadtime of 150 seconds the production rate of 40-50 tonnes per hour can be operated. For operation at higher production rates the deadtime may need to be reduced further. However, at higher temperatures, such as a temperature within the reaction zone in the range from 95° C. to 120° C. production rates of over 55 tonnes per hour can be readily achieved even with a deadtime of 150 seconds, and reducing the deadtime further would allow stable operation at higher production rates still.

BRIEF DESCRIPTION OF THE DRAWINGS

The invention is further described with reference to the accompanying drawings, in which.

EXAMPLES

Examples are simulated in a gas phase fluidised bed reactor operating with a temperature set-point of 88° C. The bed height is 20 m. The production rate is 40 t/h. Fluidising gas comprising ethylene monomer and butene comonomer is passed to the reactor to fluidise a bed of polyethylene polymer particles therein. The fluidising gas is withdrawn from the reactor and passed to a heat exchanger in which it is contacted with cooling water to cool the fluidising gas to a temperature at which a portion of the components of the fluidising gas condense to form condensed liquid. The mixture of condensed liquid and non-condensed components is passed to a separator, from which the non-condensed components are recovered overhead and recycled, via a compressor to the reactor as fluidising gas.

The liquid components are collected in a reservoir at the base of the separator, and pumped from there back to the reactor.

In the Examples a temporary increase in catalyst flow over a period of 5 minutes is applied, resulting in a temperature increase in the reactor, and requiring the control system to increase cooling and try to return the reactor to its set-point of 88° C.

Comparative Example

In this Example the reservoir is operated to maintain a constant liquid level (of 2.12 m). On variation in the reactor temperature the temperature control system signals the cooling water supply valve to open further and thereby supply further cooling to the heat exchanger. This results in increased condensation, and subsequently more liquid starts to collect in the liquid reservoir. In response to this the liquid level control increases the liquid flow to the reactor, causing reactor cooling. The level changes by less 0.05 m.

There is a delay before an increase in liquid level in the reservoir is observed, and hence before increased liquid flow to the reactor is commenced, and the reactor reaches a maximum temperature of 88.8° C. before reactor temperature starts to reduce again.

Figure 1:
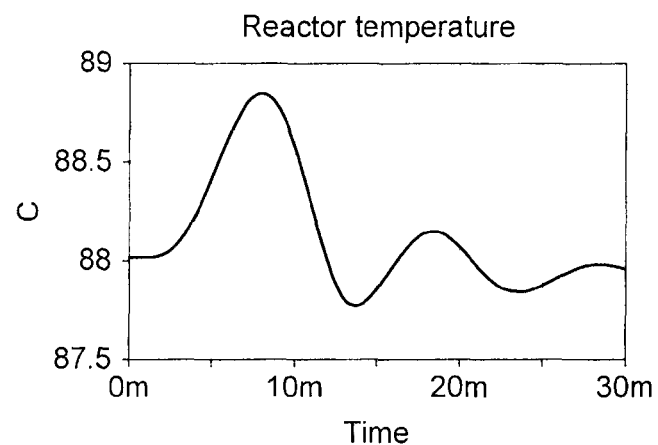
FIG. 1 are plots of reactor temperature versus time, liquid level in reservoir versus time and liquid flow to reactor versus time as described in the Comparative Example.
Figure 1:
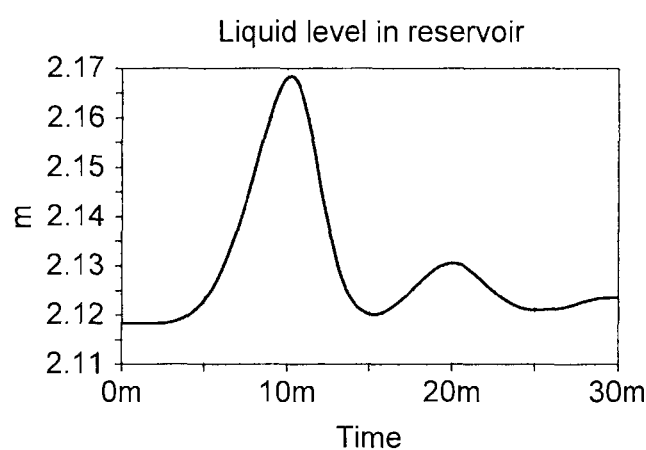
Figure 1:
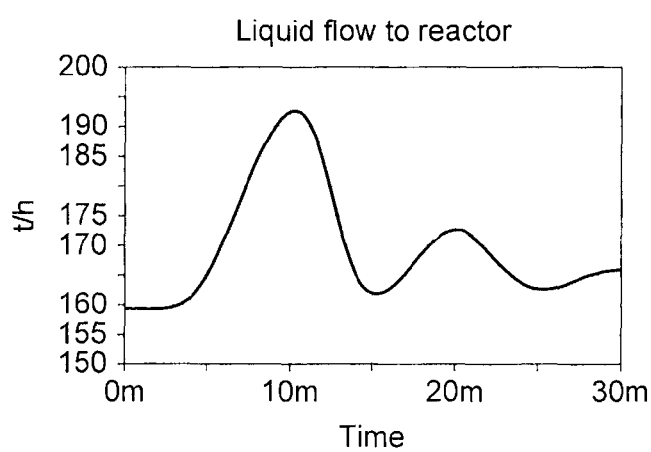

In addition even thereafter the deadtime of the system (130 s) results in the temperature reducing to below 88° C., and several oscillations in the reactor temperature and the liquid flow to the reactor are observed on returning to the steady-state. The results are shown in FIG. 1.

Example According to the Invention

In this Example the control system responds to the increase in temperature by immediately reducing the liquid level set point of the reservoir. In order to reduce the liquid level to this new set point the level controller increases the flow rate of condensed liquid from the reservoir, and hence to the reactor. At the same time the control system signals the cooling water supply valve to open further and thereby supply further cooling to the heat exchanger as in the Comparative Example. As the increased cooling in the reactor takes effect the reactor temperature starts to reduce. In response to this the liquid level set point in the reservoir is increased again. This results in the liquid flow to the reactor starting to reduce again.

As the temperature is reduced back to close to its initial level the liquid level in the reservoir also returns to close to its original level.

Figure 2:
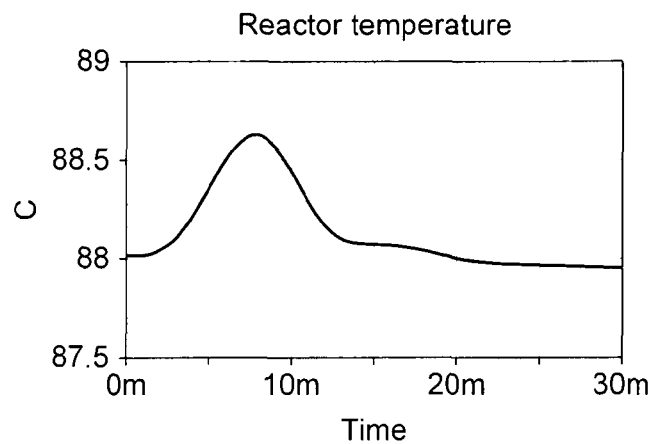
FIG. 2 are plots of reactor temperature versus time, liquid level in reservoir versus time and liquid flow to reactor versus time as described in the Example according to the invention
Figure 2:
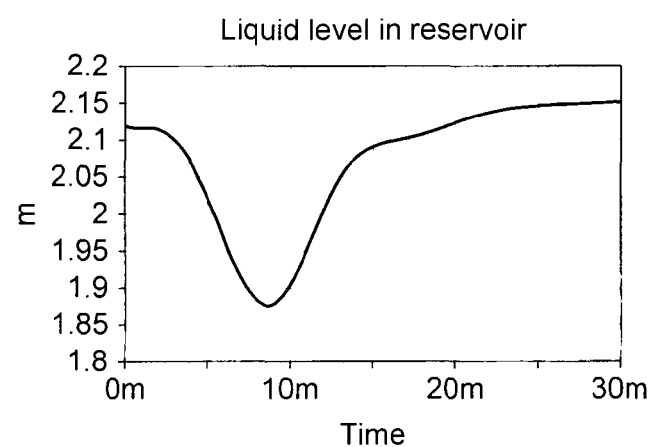
Figure 2:
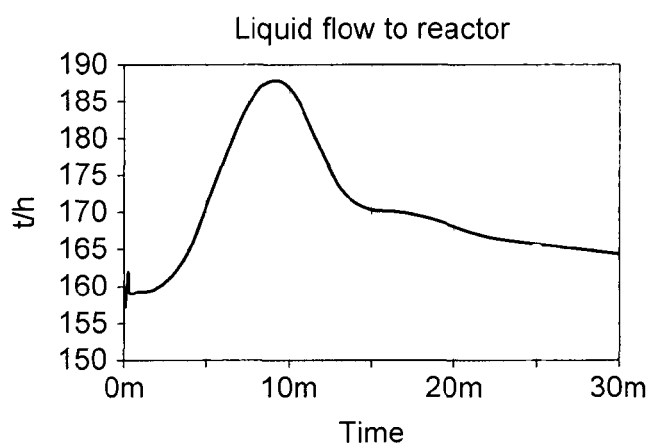

Overall the liquid level reduces to a lower level of 1.88 m at its minimum. The deadtime of this system (40 s) results in reduced variation in the temperature in the reactor, the reactor reaching a maximum temperature of only 88.6° C. before temperature starts to reduce again. Further the temperature is reduced back to 88° C. without significant oscillations. The results are shown in FIG. 2.

The invention claimed is:

1. A process for the polymerisation of olefins in a gas phase fluidised bed reactor, the polymerisation process comprising:
    i) passing a fluidising gas to the reactor to fluidise a bed of polymer particles therein,
    ii) withdrawing the fluidising gas from the reactor,
    iii) cooling all or a portion of the fluidising gas withdrawn from the reactor to a temperature at which a portion of the components of the fluidising gas condense to form condensed liquid, and
    iv) passing condensed liquid and non-condensed components of the fluidising gas back to the reactor,
    wherein there is provided a reservoir of condensed liquid downstream of the cooling step, and variations in the inventory of the condensed liquid are made in order to control the temperature in the reactor.

2. A process according to claim 1 wherein the variations in the inventory are variations in an inventory set point in the reservoir.

3. A process according to claim 1 wherein the variations in the inventory of condensed liquid are such that ΔTNR is greater than 0.1° C., ΔTNR being defined as:

$$\Delta TNR = R^*(\Delta m/\text{mass\_bed})$$

Where:
  Δm=change in mass of liquid in the reservoir [kg]
  mass_bed=mass of polymer in the fluidised bed reactor [kg]
  R=137 [and has units of ° C.].

4. A process according to claim 2 wherein the variations in the inventory of condensed liquid are of at least 5% compared to the initial inventory set point.

5. A process according to claim 1 which comprises a temperature control system for the reactor, which temperature control system acts as follows in the event that a variation in the cooling in the reactor is required:
    a) the control system acts to vary the inventory of liquid in the reservoir, and
    b) the control system acts to adjust the amount of cooling applied in step (iii).

6. A process according to claim 5 wherein the control system in step (a) acts directly on the flow of liquid from the reservoir to the reactor.

7. A process according to claim 5 wherein the control system in step (a) acts by changing the inventory set point in the reservoir.

8. A process according to claim 5 wherein the variation of the inventory of liquid in the reservoir in step (a) and the adjustment of the cooling in step (b) are performed in parallel.

9. A process according to claim 1 which has a deadtime at least 50% lower than the deadtime as would be determined for the same system under the same process conditions but based on the deadtime measured from when the control system requests a change in the applied cooling to the recycle stream if the variation in liquid inventory according to the present invention is not performed.

10. A process according to claim 1 wherein the polymerisation is a commercial scale fluidised bed polymerisation process and has a control system with a deadtime of 120 seconds or less.

11. A process for the polymerisation of olefins in a gas phase fluidised bed reactor, the polymerisation process comprising i) passing a fluidising gas to the reactor to fluidise a bed of polymer particles therein,
ii) withdrawing the fluidising gas from the reactor,
iii) cooling all or a portion of the fluidising gas withdrawn from the reactor to a temperature at which a portion of the components of the fluidising gas condense to form condensed liquid, and
iv) passing condensed liquid and non-condensed components of the fluidising gas back to the reactor,
wherein the process has a temperature control system for the reactor which has a deadtime of 120 seconds or less.

12. A process according to claim 11 wherein the deadtime is 90 seconds or less.

13. A process according to claim 1 which is a process for the production of polyethylene or polypropylene by polymerisation of ethylene or propylene respectively.

14. A process according to claim 1 which has a production rate of at least 40 tonnes/hour.

15. A process according to claim 11 which is a process for the production of polyethylene or polypropylene by polymerisation of ethylene or propylene respectively.

16. A process according to claim 11 which has a production rate of at least 40 tonnes/hour.

17. A process according to claim 2 wherein the variations in the inventory are variations in a liquid level set point.

18. A process according to claim 17 wherein the variations in the inventory of condensed liquid are of a liquid level change of at least 5% compared to the initial liquid level set point.

19. A process according to claim 17 wherein the control system in step (a) acts by changing the liquid level set point in the reservoir.

20. A process according to claim 10 wherein the deadtime is 90 seconds or less.

21. A process according to claim 10 wherein the deadtime is 60 seconds or less.

22. A process according to claim 12 wherein the deadtime is 60 seconds or less.

23. A process according to claim 14 which has a production rate of 55 tonnes/hour.

24. A process according to claim 16 which has a production rate of 55 tonnes/hour.

* * * * *